US012299053B2

United States Patent
Phillips et al.

(10) Patent No.: US 12,299,053 B2
(45) Date of Patent: May 13, 2025

(54) EXTRACTING WEBPAGE FEATURES USING CODED DATA PACKAGES FOR PAGE HEURISTICS

(71) Applicant: PAYPAL, INC., San Jose, CA (US)

(72) Inventors: David Phillips, Edgewood, WA (US); Matthew Gervasio, Seattle, WA (US)

(73) Assignee: PAYPAL, INC., San Jose, CA (US)

( * ) Notice: Subject to any disclaimer, the term of this patent is extended or adjusted under 35 U.S.C. 154(b) by 629 days.

(21) Appl. No.: 17/562,779

(22) Filed: Dec. 27, 2021

(65) Prior Publication Data

US 2023/0205825 A1    Jun. 29, 2023

(51) Int. Cl.
*G06F 16/958* (2019.01)
*G06F 16/951* (2019.01)
*G06F 16/957* (2019.01)
*G06N 5/01* (2023.01)
*G06Q 30/0201* (2023.01)
*G06Q 30/0601* (2023.01)

(52) U.S. Cl.
CPC ........ *G06F 16/951* (2019.01); *G06F 16/9577* (2019.01); *G06F 16/986* (2019.01); *G06N 5/01* (2023.01); *G06Q 30/0201* (2013.01); *G06Q 30/0641* (2013.01)

(58) Field of Classification Search
CPC .. G06F 16/951; G06F 16/986; G06F 16/9577; G06N 5/01; G06Q 30/0201; G06Q 30/0641
See application file for complete search history.

(56) References Cited

U.S. PATENT DOCUMENTS

| | | | |
|---|---|---|---|
| 11,386,478 B1* | 7/2022 | Jones | G06Q 30/0633 |
| 2019/0164199 A1* | 5/2019 | Nath | G06Q 30/0276 |
| 2019/0205364 A1* | 7/2019 | Zukerman | G06F 40/131 |
| 2020/0042651 A1* | 2/2020 | Curtis | G06F 3/0482 |

OTHER PUBLICATIONS

Ahmad Pouramini et al., Web Content Extraction Using Contextual Rules, Nov. 1, 2015, International Conference on Knowledge-Based Engineering and Innovation, pp. 1-5 (Year: 2015).*
Sandeep Sirsat et al., Pattern Matching for Extraction of Core Contents from News Web Pages, Apr. 1, 2016, International Conference on Web Research, pp. 1-6 (Year: 2016).*
International Search Report and Written Opinion for Application No. PCT/US2022/053037 mailed on Mar. 17, 2023, 17 pages.

* cited by examiner

*Primary Examiner* — Tam T Tran
(74) *Attorney, Agent, or Firm* — Haynes and Boone, LLP (70481)

(57) ABSTRACT

There are provided systems and methods for extracting webpage features using coded data packages for page heuristics. A service provider server may provide website agnostic tools that account for differences in webpage layouts. This may be done using coded data packages designed to consider webpage heuristics of different webpages. These data packages include entries that have a term, a weight, and an optional scope for searching or filtering webpage elements in webpage document code for webpages. Using multiple entries in a data package, a decision may be returned of whether a webpage includes a certain feature, data, or element, as well as data for the element. The identified feature may be used for data extraction and/or determination, which may allow one or more applications and/or browser extensions to provide services across multiple different websites without specifically formulating the data packages for certain website styles.

20 Claims, 5 Drawing Sheets

```
{
    "value": "add-to-cart",   —302
    "weight": 10   — 304
    "Scope": "id" // optional   —306
{
```

FIG. 3A

```
1  {
2      name: "FS_FINAL_PRICE",   —308
3      tests: {
4          ...
5      },
6      shape: {
7          entry{"total", 10, "id"},
8          entry{"price", 8, "class"},
9          entry{"total", 8, "class"},
10         entry{"span", 4, "tag"},
11         entry{"to", 3, "tag"},
12         entry{"tfoot", 3, "tag"},
13         entry{"last", 2, "class"},
14         entry{"hidden", 0.5, "type"},
15         entry{"input", 0.1, "tag"},
16         entry{"subtotal", 5,},
17         entry{"total", 5,},
18         entry{"price", 5,},
19         entry{"final", 3,},
20         entry{"grand", 3,},
21         entry{"due", 2,},
22         entry{"order", 2,},
23         entry{"amount", 2,},
24         entry{"cart", 2,},
25         entry{"universal", 2,},
26         entry{"basket", 2,},
27         entry{"amount", 1.5,},
28         entry{"block", 0.5,},
29         entry{"card", 0.5,},
30         entry{"label", 0.1,},
31         entry{"test", 0.1,},
32     }
33 }
```

FIG. 3B

EXTRACTING WEBPAGE FEATURES USING CODED DATA PACKAGES FOR PAGE HEURISTICS

TECHNICAL FIELD

The present application generally relates to webpage data identification and extraction using tools and data packages for applications and/or web browser extensions and more particularly to generating and providing coded data packages configured to analyze webpage heuristics to identify and extract webpage data.

BACKGROUND

An online service provider may provide services to users that may be associated with online shopping and transaction processing. These services may include those associated with finding and providing discounts and other cost savings to be applied to transactions when generated on merchant websites. This may be performed through a web browser extension that monitors, scrapes, and/or extracts website data for merchant websites when a user is browsing the website and/or generating a transaction on the merchant website. For example, the web browser extension may monitor websites and data on websites, such as items added to a digital shopping cart and a total may be calculated based on items, shipping, tax, etc. However, determining webpage elements, features, and data utilizes manual efforts, which is prohibitive due to the time and resources, or automated computing tools to identify and extract data. These automated computing tools require specific knowledge of the webpage(s) and layouts of the webpage(s) in order to properly scrape, identify, and/or extract data. Without this knowledge, the tools may not be capable of making correlations between features and data on different webpages that may have different layouts, arrange images, text, and other data differently, and/or present different data. Thus, it is desirable for online service providers to utilize webpage agnostic tools to identify and extract data.

BRIEF DESCRIPTION OF THE DRAWINGS

FIG. 3A is exemplary pseudocode for an entry for a shape data package that may be executed to identify and extract webpage features for an intent, according to an embodiment;

FIG. 3B is exemplary pseudocode for a shape data package that includes different entries executed to identify and extract webpage features, according to an embodiment;

Figure 1:
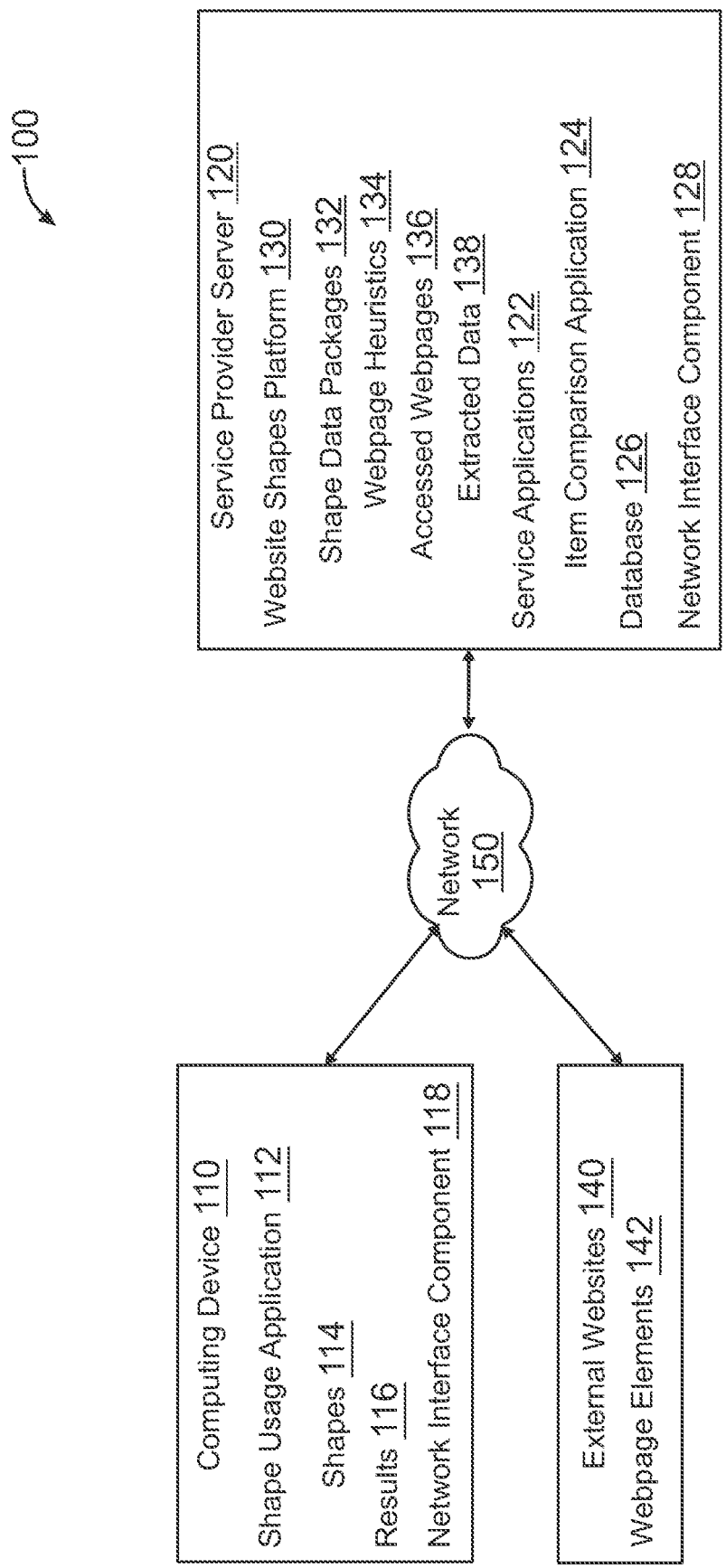
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a browser tool and/or application coded data packages for page heuristics that identify and extract webpage features, such as data for items, objects, or services on webpages, for use in data comparisons. Systems suitable for practicing methods of the present disclosure are also provided.

A service provider, such as HONEY®, may provide services associated with discounts, benefits, loyalty, and other cost savings when checking out and paying for transactions electronically on merchant websites. To provide these services, the service provider may provide a browser tool, add-on, extension, or the like, as well as a resident dedicated application (e.g., mobile application), that may monitor webpage elements on webpages of a merchant website for a merchant. This may allow the service provider to identify items, provide cross-selling and/or comparison shopping, determine and/or enter coupons and other savings, and provide other services to users on computing devices. Other service providers may also provide different services through monitoring and identifying data on websites visited by users, which may provide different benefits and utilities to users. However, with the vast array of different website constructions and webpage layouts, data presentations, and the like, service providers may encounter difficulties in identifying, extracting, and/or processing data available when users visit different webpages.

In this regard, the operations of the browser or other application extension and/or application may in coded data packages for monitoring, identifying, and extracting data for different features on multiple webpages of different websites of merchants or other entities. These coded data packages correspond to "shapes" for webpages, where each shape identifies a webpage element, data, or other feature on the webpages. Shapes are designed and coded to be webpage agnostic, and therefore may be usable across multiple different websites and their corresponding webpages. Using one or more data packages that include one or more shapes, the browser extension and/or application may execute the data packages to process scraped and/or extracted webpage code and elements. The data packages may be used to determine whether the webpage includes the corresponding webpage feature. If so, corresponding data may be extracted and/or processed to provide a service of the service provider, browser extension, and/or application to the user via the computing device.

For example, initially, a code developer, data coder, data scientist, administrator, or other user of the service provider may establish the coded data packages for the shapes and/or intents. Shapes may be generated based on webpage heuristics, such as quick identifications of particular data and/or webpage elements through certain terms, weight of those terms in determining the heuristic output, and/or additional scope of the term. In order to generate data packages based on webpage heuristics, the user may provide at least one term, weight, and option scope (e.g., a webpage element attribute) for the corresponding shape. The term may correspond to a term to identify on the different webpages, such as "product", "total", "price", "description", as well as combinations of terms and/or sequences, such as "add-to-cart" and the like. Other terms may also be used for websites different than merchant websites. A weight may correspond to a weight applied to finding and identifying the term for the shape. The higher the weight, the higher the effect that the shape (e.g., identification of the term) has when the shape is used in a corresponding intent. Further, an optional scope may correspond to a webpage element attribute, such as a HyperText Markup Language (HTML) attribute that is used for searching of the shape in HTML code for the webpages. For example, with HTML elements, the elements may have an attribute, type, or tag including "id" (e.g., a unique identifier), "class" (e.g., for classifying elements), "style", "title", and the like. The data packages may also search using webpage style information, HTML tags, and/or regular expression (regex) for the webpage, which may apply a further filter on top of the term. Each shape may have one or more entries that each have a term, a weight, and optionally, a scope in the HTML document for the webpage. Thus, each shape may be designed to heuristically locate webpage features through identification and weighting of terms found in webpage HTML code.

Using one or more shapes, the user may also generate an intent as a coded data package having one or more shapes that each represent a path to finding a result. An intent corresponds to the goal of the shape(s) and may have dependencies on other intents. For example, on merchant webpages, an intent may correspond to a final price, a question for "Is the product sold out?", add an item to digital shopping cart, navigate to a cart page, and the like. Intent data packages may further include an identifier or other title that allows for coding of the intent with other intents when generating one or more final data packages for the browser extension(s) and/or application(s). In order to test the resulting shapes, the shapes may be regressed on past artifacts for known webpages and/or webpage elements in order to determine whether the shapes are properly identifying webpage elements and may be used when developing coded data packages to identify webpage elements.

Once one or more coded data packages for shapes and/or intents are developed and created, the coded data packages may be deployed with the corresponding browser extension(s) and/or application(s). For example, HONEY® may provide a corresponding browser extension and/or application to a computing device that may implement the data packages client-side or locally on the device. The coded data packages may reside locally on corresponding devices, and the operations of the extension and/or application may detect a navigation to a webpage of a website, such as through entry and/or navigation to a specific URL or URI. Thereafter, the script may be executed to monitor, extract, and/or process webpage elements from the HTML, or extensible markup language (XML) code on the merchant website and/or checkout process. For example, webpage elements may include HTML code for listings, links, presented data, images, descriptions, fields, menus, and the like. The data may be extracted from page data for the webpage and processed by the extension or application. Further, the data package may not be specific to the particular webpage and/or overall website, and therefore may be usable with multiple different webpages for different entities' websites. Thus, each data package may heuristically locate the corresponding feature, data, and/or element across multiple webpages through identification of terms and weighting of those terms, without requirement of identification of where the feature, data, or element may occur on the webpage or in the webpage code.

Using these webpage elements determined from the webpage's document code and/or data, the extension or application may determine whether specific features, data, or webpage elements are present using the coded data packages for the shapes and/or intents. For example, the webpage elements may correspond to fields, data, and the like for item or product information and images, item identifiers, digital shopping cart information and/or access, shipping information, billing information, a total, a coupon field, available coupons and coupon information, and the like. The webpage elements may be fed or otherwise provided to the data packages, which parse and/or process the webpage elements for the corresponding term(s) of the shape(s). The weight(s) may be applied that corresponds to an effect that finding the term causes in answering a corresponding intent. Additionally, the scope or HTML tag/attribute may be used to refine the searching and/or parsing for the term in the HTML code and elements of the webpage. A decision may be heuristically rendered based on the shapes, such as if a proper webpage element is found and/or if a feature, data, or the like is present on the webpage. This may include answering, responding to, or proving an intent. For example, where multiple shapes may constitute an intent for "Is this the final total?", an output score or decision may be determined based on the combination of finding or not finding the different terms for the shapes and their corresponding effect on the intent.

Once the proper webpage feature, data, or element is identified, data for that feature or other webpage property may be determined and/or extracted. For example, for a feature corresponding to an item advertisement or available item for purchase, item information may be extracted, such as a description, a price, an image, a name or identifier, and/or other data. Where the intent may correspond to whether the webpage feature is a calculated final total, data for that total, placement or identification of field for the total, or the like may be extracted. The data may be provided to the extension and/or application for processing and identification/comparison to similar data with other website, or may be provided to the service provider for data processing and/or data comparisons and correlations. This may allow the user to view comparisons between different websites and data available on those websites, such as comparison between different items, prices of those items, and the like. This may allow for users to perform electronic transaction processing based on comparison shopping.

For example, a user may wish to process a purchase of one or more items in a transaction. Selection of one or more items during an online transaction with a merchant website may require a payment instrument from the user for electronic transaction processing. A user may pay for one or more transactions using a digital wallet or other account with an online service provider or transaction processor (e.g., PAYPAL®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items and digital gift cards (e.g., exact amount digital gift cards for detected transaction totals). The account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. The transaction processor may determine and/or track the data over a plurality of visited websites, online resources, and/or applications, for example, using an application plugin, an application extension, or an application add-on using the coded data packages discussed herein. Such extensions and/or applications may be provided by a digital platform associated with the service provider and/or transaction processor (e.g., HONEY® or another browser add-on).

In further embodiments, the data packages for the shapes and/or intents may further be used to validate "recipes" or additional coded data packages developed specifically for certain websites and/or webpages. In this regard, if the recipe and the shape are not locating the corresponding webpage feature and/or are identifying different webpage features, the shape may be used to verify if the recipe is behaving correctly and/or needs adjusting or configuring. If there is a disagreement between the shape and the recipe for a webpage, one may be given preference. For example, the shape may be used to identify the webpage feature designated by the shape and determine whether the recipe also identifies such feature if the webpage has changed and/or data for the feature has changed.

In the manner, the service provider may provide browser or other application extensions and/or dedicated software applications that may be capable of identifying and extracting data across websites and other online platforms for merchants and other entities. This allows for automated identification of webpage features without requiring specifically created scripts and other data packages for webpage data extraction. Thus, the number and required data storage resources for the data packages with the extensions and/or applications is reduced, and performance may be improved. By limiting the number of required executable scripts and/or data packages, the extensions and/or applications may more quickly execute the website agnostic data packages described herein to identify corresponding website features.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a computing device 110, a service provider server 120, and external websites 140 in communication over a network 150. Computing device 110 may be used to browse websites using a platform, application, and/or application extension provided by service provider server 120. Computing device 110 may be loaded with one or more data packages for an extension or application from service provider server 120. During use of computing device 110 with external websites 140, computing device 110 may detect when a webpage is visited that may correspond to a page for interaction by the extension or application (e.g., an item browsing page, a checkout page and/or flow, etc.). Computing device 110 may utilize the data packages designed to identify webpage features, data, and/or elements heuristically to determine if such information is available from the page and extract the information for processing.

Computing device 110, service provider server 120, and external websites 140 may each include or be associated with one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing device 110 may be implemented using any appropriate hardware and software configured for wired and/or wireless communication with service provider server 120, external websites 140, and/or another device or server for browsing websites and identifying website features, data, and/or elements. Computing device 110 may correspond to or be associated with an individual user, consumer, or merchant that utilizes computing device 110. In various embodiments, computing device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Computing device 110 of FIG. 1 contains a shape usage application 112 and a network interface component 118. Shape usage application 112 may correspond to executable processes, procedures, and/or applications with associated hardware. In other embodiments, computing device 110 may include additional or different software as required.

Shape usage application 112 may correspond to one or more processes to execute modules and associated devices of computing device 110 to provide a convenient interface to permit a user for computing device 110 to access and browse external websites 140, identify and extract data from external websites 140, and/or engage in electronic transaction processing. In this regard, shape usage application 112 may correspond to specialized hardware and/or software utilized by computing device 110 that may provide for website and item browsing, as well as transaction processing for the items. Viewing, browsing, and interacting with external websites 140 may be done through one or more user interfaces of shape usage application 112 enabling the user to access external websites 140 and enter and/or view the items that the user associated with computing device 110 wishes to purchase. This may be based on a transaction generated by shape usage application 112 using a merchant website provided by external websites 140. Shape usage application 112 may also be used by a user to provide payments and transfers to a second user or merchant. For example, shape usage application 112 may utilize user financial information, such as credit card data, bank account data, or other funding source data, as a payment instrument when providing payment information. Additionally, shape usage application 112 may utilize a digital wallet associated with an account with service provider server 120 as the payment instrument, for example, through accessing a digital wallet or account of a user through entry of authentication credentials and/or by providing a data token that allows for processing using the account. Shape usage application 112 may also be used to receive a receipt or other information based on transaction processing.

In various embodiments, shape usage application 112 may correspond to a web browser application and/or web browser extension (with a general web browser application) configured to retrieve, present, and communicate information over the Internet (e.g., utilize resources on the World Wide Web) or a private network. For example, shape usage application 112 may provide a web browser and/or extension, which may send and receive information over network 150, including retrieving website information, presenting the website information to the user, and/or communicating information to the website, including payment information for the transaction. Shape usage application 112 may correspond to a mobile web browser application. In this regard, shape usage application 112 may include a browser extension, add-on, or plug-in that may be provided by service provider server 120, such as one provided by HONEY®. However, in other embodiments, shape usage application 112 may include a dedicated application of service provider server 120 or other entity (e.g., a merchant), which may be configured to provide the services discussed herein with external websites 140. Shape usage application 112 may include operations to parse, monitor, and track data on a merchant website in order to determine whether one or more discounts, rebates, coupons, or savings are available with the merchant website, and/or provide other services for items on the merchant website. Further, shape usage application 112 may be used to add or insert savings to a transaction, for example, by entering a savings alphanumeric code, bar or QR code, text, data, or the like to a webpage field and/or option that causes the savings to be applied to and reduce a cost of a transaction.

In this regard, shape usage application 112 may include shapes 114 and results 116 may be determined using shapes 114 with one or more of external websites 140. Shapes 114 may correspond to data packages having one or more entries for term identification, weighing, and/or optional scope when parsing webpage elements and HTML or XML code for one or more webpages of external websites 140. Each entry for shapes 114 may include the corresponding term, weight, and/or optional scope, and may utilize regex, HTML tags, webpage style information, or the like. Shapes 114 may be used for identification of webpage features, data on webpages, and/or individual or groups of webpage elements when parsing and/or processing the HTML elements or code and the like. The HTML elements and code may be fed or provided as input to shapes 114, where a decision or score on whether the corresponding webpage feature, data, or element(s) is found on the webpage (e.g., in the webpage document's code) may be provided as results 116. In some embodiments, results 116 may be determined using regex, HTML tags, or the like to apply additional filters on top of the term for each entry in shapes 114. HTML tags, regex, and the like may therefore be used when parsing and/or processing webpage elements using shapes 114 and other webpage code from an HTML document and/or based on the CSS style/language used to designate the presentation of webpage elements. Results 116 may be used to extract data for the corresponding webpage feature, data, or element(s). Using the extracted data based on results 116, shape usage application 112 may be used to provide one or more services to the user of computing device 110 and/or service provider server 120. For example, the extracted data may be used for comparison shopping, identification of savings and/or coupons, coupon entry, and the like, as well as the data may be provided to service provider server 120 for usage.

Computing device 110 may further include a database, which may include, for example, identifiers such as operating system registry entries, cookies associated with shape usage application 112 and/or other applications, identifiers associated with hardware of computing device 110, or other appropriate identifiers. Identifiers in the database may be used by a payment/service provider to associate computing device 110 with a particular account maintained by the payment/service provider. The database may also further store shapes 114, which may correspond to coded data packages used by shape usage application 112 with external websites 140. In various embodiments, received website data may be stored by the database, which may be parsed and/or processed to determine whether certain webpage features, data, or elements are found on the webpage and/or in the webpage code.

Computing device 110 includes at least one network interface component 118 adapted to communicate with service provider server 120, external websites 140, and/or another device or server over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for monitoring website browsing and providing services and data to users on webpages using data packages for shapes and/or intents. Various embodiments of the webpage processing system described herein may be provided by service provider server 120 and may be accessible by computing device 110 when accessing one or more of external websites 140. In such embodiments, service provider server 120 may interface with computing device 110 to provide data packages that enable computing device 110 to determine webpage features, data, and/or elements, such as whether those elements are present and what the element constitute. Service provider server 120 includes one or more processing applications which may be configured to interact with computing device 110 and external websites 140. In one example, service provider server 120 may be provided by PAYPAL® and/or HONEY®. However, in other embodiments, service provider server 120 may be maintained by or include another type of service provider.

Service provider server 120 of FIG. 1 includes a website shapes platform 130, service applications 122, a database 126, and a network interface component 128. Website shapes platform 130 and service applications 122 may correspond to executable processes, procedures, and/or applications with associated hardware. In other embodiments, service provider server 120 may include additional or different modules having specialized hardware and/or software as required.

Website shapes platform 130 may correspond to one or more processes to execute modules and associated specialized hardware of service provider server 120 to generate and provide shapes and intents having one or more shapes that are provided to computing devices of users for website agnostic data identification and extraction. In this regard, website shapes platform 130 may correspond to specialized hardware and/or software used by a user associated with computing device 110 to establish shape data packages 132, which may be based on webpage heuristics 134. For example, webpage heuristics 134 may correspond to user experience and/or user interface design rules and/or decisions that allow systematic determination of webpage layouts and/or features, data, and/or elements on a webpage. This may be based on webpage code, such as webpage elements. For example, an HTML document for a webpage may include webpage elements, where the HTML code for the document may be extracted and parsed by computing devices when using shape data packages 132. This allows for determination of webpage features, data, or one or more specific elements to determine if a page contains certain data, which may be identified, extracted, and used with one or more on-device computing operations and/or service applications 122.

A code developer, data coder, data scientist, administrator, or other user of service provider server 120 may create and/or provide shape data packages 132. This may be done by establishing one or more entries for each of shape data packages, where each entry includes a value or term, a weight, and optionally a scope (e.g., webpage element attribute). Shape data packages 132 may implement additional filters and/or filtering and searching operations, for example, using regex, HTML tags, webpage styles, and the like, which may allow identification of webpage elements and/or corresponding features and data, using such tools and filters. A shape may then be constructed with one or more entries and may be added to those available for shape data packages 132. The entries and shape data packages 132 may be based on webpage heuristics 134 so that shape data packages 132 are webpage and website agnostic (e.g., may be used over different webpages of the same and/or different website). Shape data packages 132 may be configured to determine a title, a type of webpage or other page detection, savings on webpages, applying coupons on webpages, and other features and operations associated with multiple webpages without consideration of the specific domain for the webpage. Multiple ones of shape data packages 132 may be ran at the same time and/or sequentially to determine specific properties of a webpage and/or features, data, and/or elements on a webpage (e.g., to answer or response to an intent that includes one or more of shape data packages 132).

After receiving shape data packages 132, website shapes platform 130 may perform a regression on those shapes using past known artifacts for webpages and/or known webpage features, data, or elements to determine if the shapes are meeting a confidence threshold or score in identifying the corresponding webpage information for each of shape data packages 132. Regression may be run to determine a confidence in each of shape data packages 132. Once the confidence has been met, shape data packages 132 may be deployed. For example, shapes 114 on computing device 110 may be provided as a portion of all of shape data packages 132, which may be executed when the corresponding browser extension, browser, or application is executed and browses external websites 140. Thereafter, based on shapes 114 and webpage elements 142 from accessed webpages 136 of external websites 140, extracted data 138 may be returned for accessed webpages 136. This may be returned and used to receive additional services provided by service applications 122, such as savings, coupon, item discount, transaction processing, and the like.

Service applications 122 may correspond to one or more processes to execute modules and associated specialized hardware of service provider server 120 to process a transaction or provide another service to customers, merchants, and/or other end users and entities of service provider server 120. In some embodiments, service applications 122 may be used by a user associated with computing device 110 to establish a user and/or payment account, as well as a digital wallet, which may be used to process transactions. For example, an account provided by HONEY® may be provided for item comparison application 124. However, a more general account (e.g., a PAYPAL® account) may also provide the account services and be utilized for service applications 122. In various embodiments, financial information may be stored with the account, such as account/card numbers and information that may enable payments, transfers, withdrawals, and/or deposits of funds. A digital token for the account/wallet may be used to send and process payments, for example, through an interface provided by service provider server 120. The account may also be used to receive and/or utilize rewards, loyalty points, coupons, incentives, discounts, and the like with one or more of external websites 140.

In this regard, item comparison application 124 of service applications 122 may provide savings and coupon services via shape usage application 112, for example, by providing item comparison shopping, coupons and savings, and the like while browsing and/or purchasing items on external websites 140. Shapes 114 for shape usage application 112 (e.g., generated and/or provided by website shapes platform 130) may be used when identifying, determining, and/or extracting features, data, and/or elements on multiple webpages in a website agnostic manner, which may be utilized for the savings and coupon services. The account may be accessed and/or used through a web browser application/extension and/or dedicated software application executed by computing device 110 and engage in computing services provided by service applications 122. Service applications 122 may also include or utilize different processors, engines, or models as required for an authentication, account setup and maintenance, electronic transaction processing, deposit and/or withdrawal, and the like, for example, through one or more platforms that may be integrated through different API integrations to allow APIs of the platforms, services, and applications to exchange data. Service applications 122 may include one or more APIs that perform API calls and requests, and receive responses, to provide services including item comparison application 124.

In various embodiments, service applications 122 and/or item comparison application 124 may be used when navigating to and/or between webpages, applications and/or application interfaces, computing services, digital resources, and the like. For example, service applications 122 and/or item comparison application 124 may be used with accessed webpages 136, where extracted data 138 may be used to provide one or more services. Thus, service applications 122 and/or item comparison application 124 may provide services associated with websites and webpages via shape usage application 112, which may correspond to one or more external websites 140 and associated resources to provide features, services, and other operations for a user, purchaser, merchant, seller, or the like. In this regard, the webpages of various external websites 140 may be utilized by one or more merchants to provide transaction processing and sales. For example, service applications 122 and/or item comparison application 124 may interface with computing device 110 while browsing the webpages of external websites 140 and provide services via shape usage application 112.

Service applications 122 may further be utilized by customers and other end users to view one or more user interfaces (UIs), for example, via graphical UIs (GUIs) presented using an output display device of computing device 110. These UIs may be used with shape usage application 112 and/or external websites 140 to navigate through items for sale on the merchant website, generate a transaction, receive savings and other discounts or coupons, and checkout for the transaction on the merchant website. Service applications 122 may process the payment and may provide a transaction history to computing device 110 for transaction authorization, approval, or denial. However, in other embodiments, service applications 122 may instead provide different computing services, including social networking, microblogging, media sharing, messaging, business and consumer platforms, etc.

Service applications 122 may provide additional features to service provider server 120. For example, service applications 122 may include security applications for implementing server-side security features, programmatic client applications for interfacing with appropriate application programming interfaces (APIs) over network 150, or other types of applications. Service applications 122 may contain software programs, executable by a processor, including one or more GUIs and the like, configured to provide an interface to the user when accessing service provider server 120, where the user or other users may interact with the GUI to view and communicate information more easily. In various embodiments, service applications 122 may include additional connection and/or communication applications, which may be utilized to communicate information to over network 150.

Additionally, service provider server 120 includes database 126. Database 126 may store various identifiers associated with computing device 110. Database 126 may also store account data, including payment instruments and authentication credentials, as well as transaction processing histories and data for processed transactions. Database 126 may store shape data packages 132, as well and information for constructing and/or testing shape data packages 132. Further, data associated with providing services via service applications 122 may be stored by database 126.

In various embodiments, service provider server 120 includes at least one network interface component 128 adapted to communicate with computing device 110, external websites 140, and/or another device/server for a merchant over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

External websites 140 may correspond to one or more online websites and associated resources to provide features, services, and other operations for a merchant, seller, or the like to advertise, market, sell, and/or provide items for sale, as well as provide checkout and payment. In this regard, external websites 140 may be utilized by one or more merchants to provide websites and/or online portals for transaction processing and sales. For example, external websites 140 may be used to host a website having one or more webpages that may be used by customers to browse items for sale and generate a transaction for one or more items. External websites 140 may provide a checkout process, which may be utilized to pay for a transaction. In some embodiments, the checkout process may be provided by service provider server 120 based on one or more operations, software development kits (SDKs), application programming interface (API) standards or guidelines, and the like that may be implemented in the merchant website. The checkout process may be used to pay for a transaction using a payment instrument, including a credit/debit card, and account with service provider server 120, or the like. External websites 140 may be utilized by customers and other end users to view one or more user interfaces, for example, via graphical user interfaces (GUIs) presented using an output display device of computing device 110. These user interfaces may be used to navigate through items for sale on the merchant website, generate a transaction, and checkout for the transaction on the merchant website. Further, external websites 140 may be processed and/or parsed to scrape and/or extract data (e.g., HTML code and/or elements from CSS/HTML documents for webpages) when viewing items, engaging in electronic transaction processing, or otherwise interacting with external websites 140. Thus, computing device 110 may identify different features of webpages for external websites 140, such as when browsing items and engaging in transaction processing in shape usage application 112 on computing device 110.

External websites 140 may provide features, services, and other operations for sales and checkout purchases. In this regard, external websites 140 may be utilized to provide websites and/or online portals for transaction processing and sales. For example, external websites 140 may be used to host a website having one or more webpages that may be used to browse items for sale and generate a transaction for one or more items. External websites 140 may then provide a checkout process, which may be utilized to pay for a transaction. The checkout process may be used to pay for a transaction using a payment instrument, including a credit/debit card, and account with service provider server 120, or the like. External websites 140 may be utilized by a user and/or merchant to view one or more user interfaces (UIs), for example, via graphical UIs (GUIs) presented using an output display device of computing device 110. Thus, these UIs may be used to navigate through items for sale on the merchant website, generate a transaction, and checkout for the transaction on the merchant website.

In order to provide data and features for external websites 140, external webpages may include webpage elements 142 corresponding to HTML or XML code and/or code snippets for different one of webpage elements 142, data, and/or features presented via webpages of external websites 140. These webpage elements 142 within one or more webpages provide the operations, input fields, menus, and the like to view and/or search for items, browse items, add items to digital shopping carts, and/or complete a checkout. For example, webpage elements 142 may include elements for items, coupons or savings, shipping, billing, name, account identifier, item total, sales tax, tip, shipping costs, and the like. In other embodiments, webpage elements 142 may provide different webpage data and features. Computing device 110 may parse webpage elements 142 using coded data packages for shapes and/or intents, discussed herein, and may determine whether any of the features, data, and/or elements corresponding to the shapes or features occur on webpages of external websites 140. If so, data may be extracted, which may allow for determination of data on the webpage and/or interaction with features and elements of the webpage.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
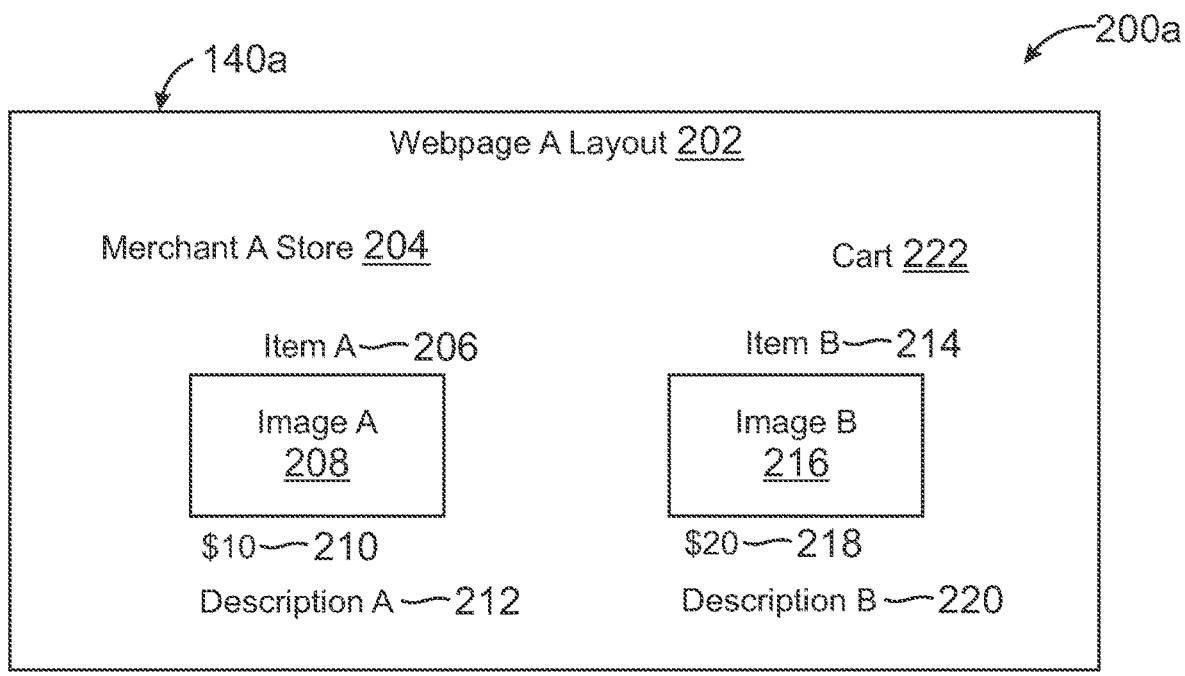
FIG. 2A is an exemplary user interface displaying a first merchant website having a first layout of webpage features and data, according to an embodiment.
Figure 2B:
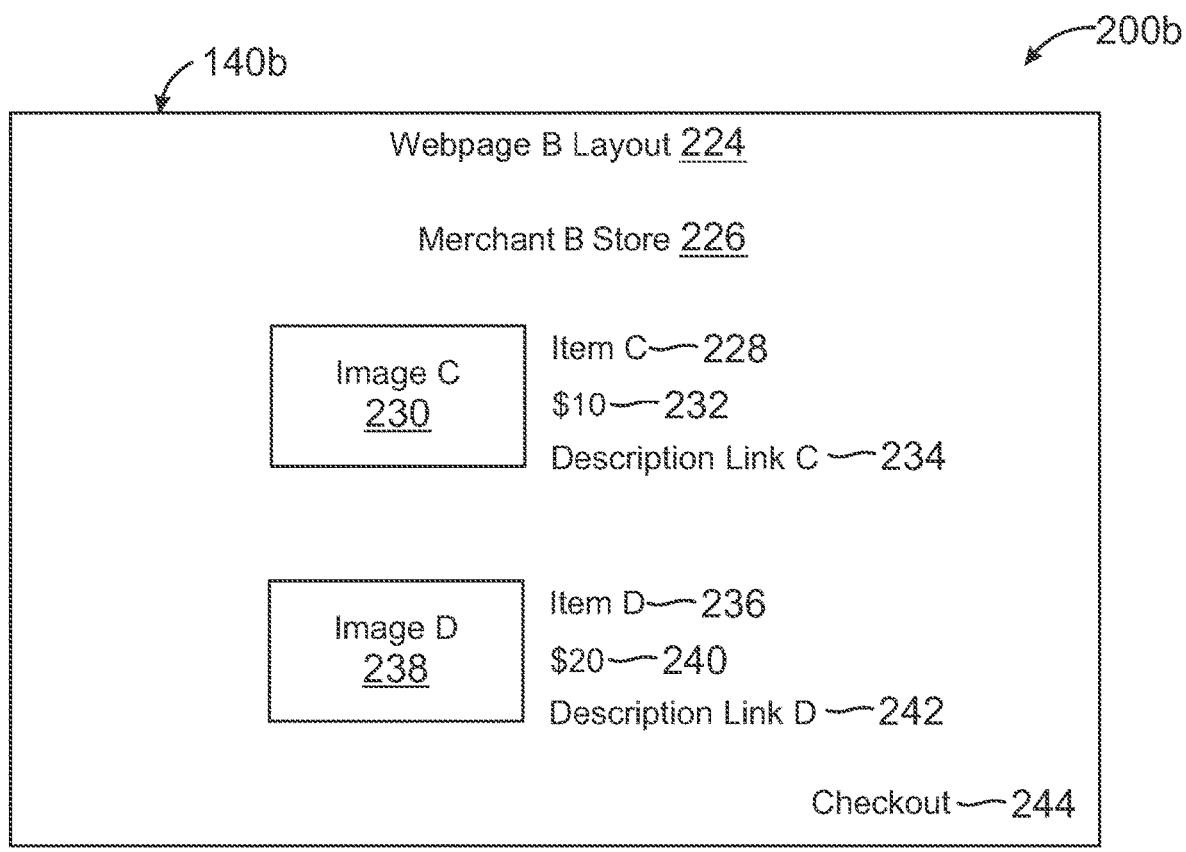
FIG. 2B is an exemplary user interface displaying a second merchant website having a second layout of webpage features and data, according to an embodiment.

FIG. 2A is an exemplary user interface 200a displaying a first merchant website having a first layout of webpage features and data, according to an embodiment. FIG. 2B is an exemplary user interface 200b displaying a second merchant website having a second layout of webpage features and data, according to an embodiment. User interface 200a of FIG. 2A and user interface 200b of FIG. 2B both display different webpages for different websites, which may be displayed by computing device 110 discussed in reference to system 100 of FIG. 1. In this regard, computing device 110 displaying user interfaces 200a and 200b when visiting external websites 140, such as a website 140a in user interface 200a and a website 140b in user interface 200b.

User interface 200a on computing device 110 displays an item browsing and/or merchant marketplace webpage for website 140a, while user interface 200b displays a similar item browsing and/or merchant marketplace webpage for website 140b. However, a webpage A layout 202 for website 140a has a different layout from webpage B layout 224 for website 140b. Conventionally, tools used to identify, determine, and/or extract webpage data for the webpages corresponding to webpage A layout 202 and webpage B layout 224 may be required to be specifically configured to identify, either based on the page layout and dynamics or the corresponding CSS layout/style and/or HTML, document structure, where the corresponding webpage elements are for the features and data on webpage A layout 202 and webpage B layout 224. This has numerous drawbacks, such as where a "recipe," script, or other automation tool for webpage data identification and extraction would not be compatible between webpage A layout 202 and webpage B layout 224.

For example, titles are shown in webpage A layout 202 and webpage B layout 224, where merchant A store 204 is off center while merchant B store 226 is centered. Similarly, layouts for items and item information in webpage A layout 202 and webpage B layout 224 may be different. For example, in webpage A layout 202 titles for item A 206 and item B 214 are shown above an image A 208 and an image B 216, respectively. Below image A 208 is a price 210 and a description A 212, while below image B 216 is a price 218 and a description B 220. Further, a digital shopping cart option is shown in a top right corner that may allow a user to view the cart and/or perform a checkout. In contrast with webpage B layout 224, titles for item C 228 and item D 236 are to the right of an image C 230 and an image D 238. Under the title for item C 228 is a price 232 and a description link C 234, while under is a price 240 and a description link D 242. A checkout option 244 is shown in a bottom right corner where a user may navigate to a digital shopping cart and/or perform a checkout.

However, item A 206 may correspond to the same item as item C 228 and item B 214 may correspond to the same item as item D 236, however, sold by different merchants on websites 140a and 140b. As shown in webpage A layout 202 and webpage B layout 224, items may have different layouts of corresponding item images, information, and the like, as well as different selectable option or elements, such as links to descriptions, images, and the like. Additionally, cart 222 and checkout option 244 may correspond to the same or similar digital shopping cart and/or checkout process. When using recipes or other website specific automation tools or operations for feature identification and/or data extraction, cross usage of the tools between webpage A layout 202 and webpage B layout 224 may fail when the tools are unable to correctly identify webpage elements and/or corresponding information based on changes to CSS style for the webpages and/or HTML document code.

However, using shapes as coded data packages that are webpage agnostic, the data on webpage A layout 202 and webpage B layout 224 may be identified, determined, and/or extracted without consideration for the layouts of webpage A layout 202 and webpage B layout 224 and/or the corresponding CSS style and/or HTML document structure. For example, a coded data package may include entries for filtering/searching webpage elements (e.g., HTML elements from an HTML document for the webpages corresponding to webpage A layout 202 and webpage B layout 224), which each may include a term, weight, and optional scope. The data packages may also search using an HTML tag, regex, webpage style, or the like. This may allow for agnostic searching and processing of webpage A layout 202 and webpage B layout 224 without considering the specific layout by using a weighted decision based on the occurrence or absence of terms and a confidence rating, threshold, or score. HTML tags, regex, and the like may be used to provide an additional filter, where webpage features may be identified through their corresponding webpage elements using the filter with the corresponding term. For example, regex may be used to provide enhanced filtering/searching through the webpage elements. Once identified, data associated with the identified webpage features or elements may be extracted and/or other operations may be provided, such as through comparison shopping by comparing items, adding coupons to a field, adjusting or showing an adjusted a total using available coupons, linking to other similar data, or the like.

FIG. 3A is exemplary pseudocode 300a for an entry for a shape data package that may be executed to identify and extract webpage features for an intent, according to an embodiment. Pseudocode 300a may correspond to a particular entry used for a shape's data package, which may be used for identification of features of a webpage, as well as extraction, classification, and/or description of those features. Pseudocode 300a may be run in real-time or near real-time in a website layout agnostic manner by an application on a computing device, such as shape usage application 112 on computing device 110 in system 100 of FIG. 1.

In this regard, pseudocode 300a is shown with a term 302. Term 302 is designated with "value" and includes a term of "add-to-cart". Term 302 may be single terms or words, as well as combinations and sequences. Pseudocode 300a further includes a weight 304 of "10". Weight 304 may be used to provide an overall weight in finding and/or filtering term 302 in webpage elements for a webpage's HTML document. In some embodiments, webpage elements extracted from the HTML document's code may also include additional CSS information, such as a unique identifier for each element on the page and/or a true/false indicator to indicate whether the element is visible. Pseudocode 300a further includes a scope 306, which is shown as optional and include "id" for webpage element attribute (e.g., a unique identifier for term 302). Multiple entries similar to pseudocode 300a may be collected and/or placed together to generate a pseudocode 300b in FIG. 3B.

FIG. 3B is exemplary pseudocode 300b for a shape data package that includes different entries executed to identify and extract webpage features, according to an embodiment. Pseudocode 300b may correspond to multiple entries for a shape that provides identification of features of a webpage, as well as extraction, classification, and/or description of those features. Pseudocode 300b may be run in real-time or near real-time in a website layout agnostic manner by an application on a computing device, such as shape usage application 112 on computing device 110 in system 100 of FIG. 1.

In pseudocode 300b, a shape 308 is shown for a data structure or package that includes entries used to determine a particular feature of a webpage, which may also include data or specific webpage elements. For example, shape 308 is designated with a name of "FS_FINAL_PRICE" associated with a final price of an item or transaction. Shape 308 may therefore parse and process the webpage elements from the HTML document for a webpage to determine whether a final price may be present using entries 310. Each of entries 310 includes data similar to pseudocode 300a of FIG. 3A, such as a term, weight, and optional scope. Using the combination of entries 310, a determination or identification of whether a page includes a particular feature, as well as identification and determination of the feature and/or webpage elements constituting the feature, may be performed by shape 308.

When testing shape 308, regression may be run against known artifacts and/or webpages/webpage elements to determine if proper results are being identified. This may also be done using common websites and/or websites that receive high volumes of traffic, where shape 308 is likely to be used. When testing weights for terms (including scopes), a score for shape 308 may be calculated based on the independent ones of entries 310. Further, exactly matched terms (including scopes) may be analyzed, as well as a confidence in relation to other matches (e.g., a score against other matches when compared). For example, in order to meet proper identification, classification, and description of webpage features, such as to extract data for the feature, compare or contrast similar data and/or features on other websites, and/or provide input or selection to fields and menus (e.g., for automatic coupon or discount entry), shape 308 may be required to meet or exceed a confidence rating, score, or threshold on properly identify the webpage feature. Shape 308 may also be compared to a recipe, script, or other data package specifically configured for a webpage to determine if the two data packages are in agreement and match when classifying features of a page.

Figure 4:
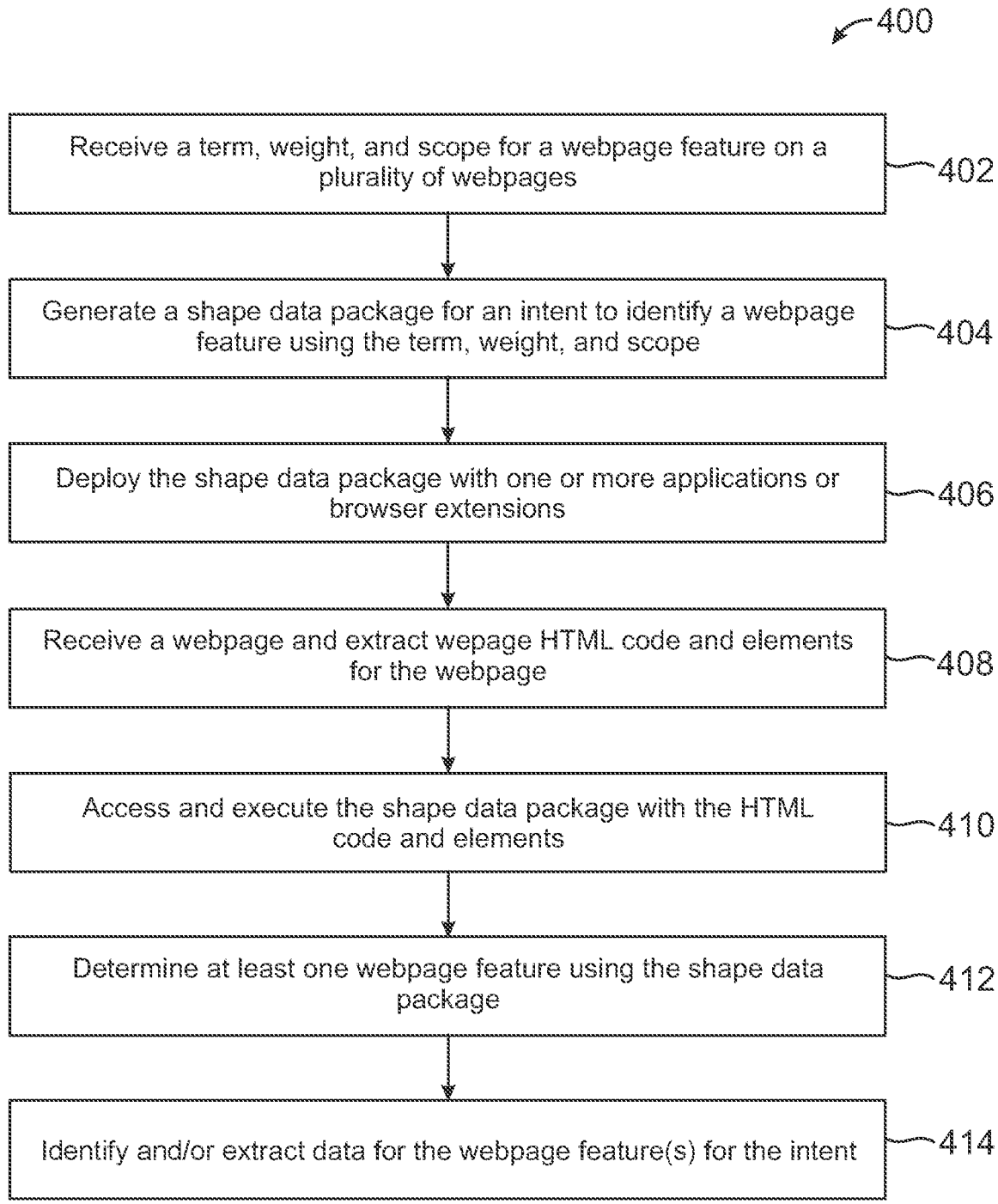
FIG. 4 is a flowchart for extracting webpage features using coded data packages for page heuristics, according to an embodiment.

FIG. 4 is a flowchart 400 for extracting webpage features using coded data packages for page heuristics, according to an embodiment. Note that one or more steps, processes, and methods described herein of flowchart 400 may be omitted, performed in a different sequence, or combined as desired or appropriate.

At step 402 of flowchart 400, a term, weight, and scope for a webpage feature on a plurality of webpages is received. Each of these data values may be used as a single entry for a shape, where more than one entry may also be used to generate the shape. The term corresponds to a term for filtering and/or searching in webpage elements when parsing those elements from HTML or other code for a webpage's document. The weight may be a corresponding weight to apply when the term is found or if the term is not found, thereby affecting a score, weighted average, or the like when determining if a particular webpage feature, data, or element is present on a webpage and classify the feature, data, or element. The scope may be optional and may correspond to additional information to allow filtering and/or identification of terms and webpage elements. The scope may provide additional filtering and/or narrowing to identification of the term within the webpage elements.

Using this information, at step 404, a shape data package for an intent to identify a webpage feature is generated using the term, weight, and scope. The one or more weights may be consolidated into a single data package, which may the be usable by applications and/or extensions on computing devices. At step 406, the shape data package is deployed with one or more applications or browser extensions. This may include the applications and/or extensions fetching and storing the shape data package (as well as other shape data packages) and/or a service provider's server for the applications and/or extensions pushing and loading the shape data package to the devices utilizing the applications and/or extensions (which may occur through an application/extension refresh or update).

At step 408, a webpage is received, and webpage HTML code and elements are extracted for the webpage. This may include accessing and determining HTML code from an HTML document for the webpage, as well as determining the webpage elements and other attributes. The HTML code may include HTML elements or other individual HTML tags that may be pulled from the webpages HTML code and parsed using the shape data package. Further, the webpage elements may include additional information, such as CSS information and/or attributes.

At step 410, the shape data package is accessed and executed with the HTML code and elements. The application and/or extension may execute the shape data package to parse the HTML code and elements. This may include feeding the obtained elements for the webpage to the different shapes for the application and/or extension, where the shapes may also be combined for intents. At step 412, at least one webpage feature is determined using the shape data package. The shape data package may be used to parse the HTML code and/or elements for the terms and apply a weight to whether the term is found or not. The scope may also be used to further filter and refine the filtering of the HTML code for the term and more specific identification of the term within the HTML code and/or elements.

In various embodiments, regex, webpage style information, and the like may also be used by the application and/or extension utilizing the shape data package to parse HTML elements for the webpage. For example, regex may assist in identifying webpage elements and terms, which may be used to determine if a feature is found on a webpage and/or provide a response to an intent. At step 414, data for the webpage feature(s) for the intent is identified and/or extracted. This may include determining and classifying the webpage feature(s) in order to provide additional services to users. For example, data comparisons may be provided (e.g., comparison shopping), as well as identification of coupons, discounts, and benefits. Fields and menus may be identified to auto-enter data and/or provide input on behalf of a user. Data may also be extracted and provided to the application/extension's service provider for processing, such as to provide data analytics and/or information to one or more users.

Figure 5:
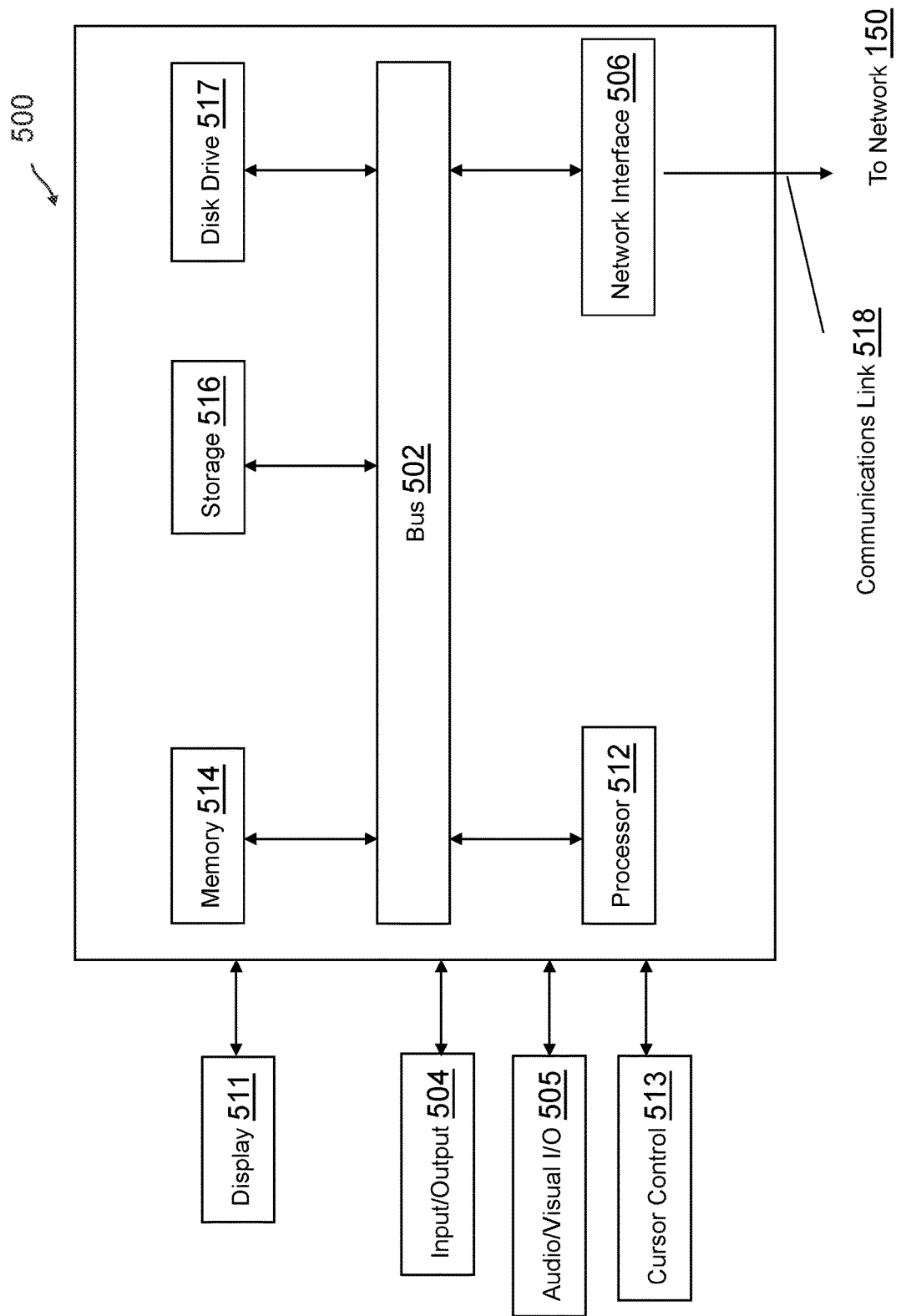
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A service provider system comprising:
a non-transitory memory; and
one or more hardware processors coupled to the non-transitory memory and configured to read instructions from the non-transitory memory to cause the service provider system to perform operations comprising:

receiving webpage data for a webpage accessible by a software operation of the service provider system, wherein the webpage comprises at least one webpage feature usable to provide at least one notification to a user via the software operation during a browsing of the webpage by the user, and wherein the webpage data includes a plurality of terms of the webpage;

determining an intent for searching the webpage for the at least one webpage feature based on the plurality of terms and a corresponding identifier of each of the at least one webpage feature;

accessing a coded data package for the webpage based on the intent, wherein the coded data package comprises webpage heuristics for a layout of the at least one webpage feature on a plurality of webpages;

determining a weighted term and a webpage element attribute for the at least one webpage feature from the coded data package, wherein the weighted term is searched for in the webpage data based on the webpage element attribute;

determining the at least one webpage feature based on the weighted term, the webpage element attribute, and the webpage data; and extracting data for the at least one webpage feature from the webpage.

2. The service provider system of claim 1, wherein the webpage heuristics comprise a webpage shape corresponding to the intent that enables identification of the at least one webpage feature on the layout of the plurality of webpages using the weighted term and the webpage element attribute, and wherein the webpage heuristics enable the software operation to heuristically locate the at least one webpage feature using the webpage shape and HyperText Markup Language (HTML) code for the webpage.

3. The service provider system of claim 2, wherein the at least one webpage feature is associated with at least one of a product title, a product name, a product description, a product price, or a product discount.

4. The service provider system of claim 1, wherein the operations further comprise:

detecting a navigation to another webpage of the plurality of webpages by a computing device of a user; and causing to be displayed, to the user on the computing device via the software operation, the extracted data with the other webpage.

5. The service provider system of claim 4, wherein the operations further comprise:

providing, using the extracted data, the software operation, and the coded data package, a comparison of a first product on the webpage to a second product on the other webpage.

6. The service provider system of claim 1, wherein the coded data package further comprises filtering logic and at least one description of the at least one webpage feature on the plurality of webpages.

7. The service provider system of claim 1, wherein the software operation is associated with one of a web browser application extension or a dedicated mobile application provided by the service provider system.

8. The service provider system of claim 1, wherein the coded data package further comprises one or more operations to parse HTML code for the plurality of webpages to identify the at least one webpage feature on the plurality of webpages.

9. The service provider system of claim 1, wherein the coded data package uses regular expression (regex) for identifications of the at least one webpage feature using the webpage heuristics for the plurality of webpages.

10. The service provider system of claim 1, wherein the operations further comprise:

validating a data extract operation specific to the webpage using the coded data package, wherein the validating confirms whether the data extraction operation extracts the data from the at least one webpage feature.

11. A method comprising:

identifying a webpage accessible, via one or more computing devices, by one or more users during one or more uses of a service provider application or a service provider browser extension with the webpage, wherein the webpage comprises one or more items purchasable by the one or more users;

determining an intent for searching the webpage for the one or more items based on the one or more uses;

determining one or more webpage shape heuristics utilizable to search the webpage based on the intent, wherein the one or more shape heuristics each comprise a weighted term and a webpage element attribute associated with identifying the one or more items on the webpage;

determining webpage feature layout data for the webpage from webpage computing code for the webpage;

determining, using the one or more webpage shape heuristics, item data for the one or more items on the webpage; and storing the item data with an identifier for the webpage for the service provider application or the service provider browser extension.

12. The method of claim 11, wherein the one or more uses comprises a browsing session of at least one other webpage for the one or more items further purchasable via the at least one other webpage.

13. The method of claim 12, further comprising:

presenting the item data to a user on a computing device of the user during the browsing session.

14. The method of claim 11, further comprising:

accessing another webpage via the service provider application or the service provider browser extension; and causing the item data to be displayed via the service provider application or the service provider browser extension with the other webpage.

15. The method of claim 11, wherein the webpage comprises an online merchant marketplace for the one or more items, wherein the intent is associated with at least one of a title, a product, a description, or a price, and wherein the webpage feature layout data comprises one of Hypertext Markup Language (HTML) code, Extensible Markup Language (XML) code, or JavaScript code.

16. The method of claim 11, further comprising:

verifying at least one data extraction tool specific to the webpage using the one or more webpage shape heuristics.

17. A non-transitory machine-readable medium having stored thereon machine-readable instructions executable to cause a machine to perform operations comprising:

extracting data for an item on a website of a merchant using at least one of a plurality of webpage heuristic data packages, wherein the data comprises at least one descriptive parameter of the item;

storing the extracted data for the item with an identification of the website;

receiving a request to view the item on the website during a usage of an application extension of a browser application, wherein the application extension provides an item comparison of the item to one or more other items;

determining an intent for searching the webpage for item data for the item comparison;

determining a weighted term and a webpage element attribute associated with the intent based on the at least one of the plurality of webpage heuristic data packages;

determining the extracted data using the at least one of the plurality of webpage heuristic data packages, wherein the determining the extracted data comprises identifying the item using the weighted term and the webpage element attribute; and presenting the extracted data via the application extension through the browser application.

18. The non-transitory machine-readable medium of claim 17, wherein the item is a first item and the data is a first data, wherein the website further includes a second item on the website, and wherein the operations further comprise:

differentiating between the first data for the first item and second data for the second item using the at least one of the plurality of webpage heuristic data packages.

19. The non-transitory machine-readable medium of claim 17, the plurality of webpage heuristic data packages are each coded to identify different webpage features for data for a plurality of items on a plurality of webpages.

20. The non-transitory machine-readable medium of claim 17, wherein the at least one of the plurality of webpage heuristic data packages uses regular expressions (regex) for identification of webpage features corresponding to the data.

\* \* \* \* \*